(12) United States Patent
Venugopalan et al.

(10) Patent No.: US 10,671,988 B2
(45) Date of Patent: Jun. 2, 2020

(54) METHODS AND SYSTEMS FOR PROCESSING AN ELECTRONIC PAYMENT

(71) Applicant: MasterCard Asia/Pacific Pte. Ltd., Singapore (SG)

(72) Inventors: Vijin Venugopalan, Singapore (SG); Benjamin Charles Gilbey, Singapore (SG); Prashant Sharma, Madison, NJ (US)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 1148 days.

(21) Appl. No.: 15/042,717

(22) Filed: Feb. 12, 2016

(65) Prior Publication Data

US 2016/0239833 A1    Aug. 18, 2016

(51) Int. Cl.
*G06Q 20/20*     (2012.01)
*G06Q 20/38*     (2012.01)
*G06Q 20/32*     (2012.01)

(52) U.S. Cl.
CPC ......... *G06Q 20/20* (2013.01); *G06Q 20/3274* (2013.01); *G06Q 20/385* (2013.01); *G06Q 20/38215* (2013.01)

(58) Field of Classification Search
CPC .............................................. G06Q 20/00–425
See application file for complete search history.

(56) References Cited

U.S. PATENT DOCUMENTS

| 2012/0259782 | A1 | 10/2012 | Hammad | |
|---|---|---|---|---|
| 2013/0117185 | A1 | 5/2013 | Collison et al. | |
| 2014/0143144 | A1 | 5/2014 | DuCharme | |
| 2015/0112870 | A1* | 4/2015 | Nagasundaram | G06Q 20/385 705/67 |

FOREIGN PATENT DOCUMENTS

WO    2014/130222 A1    8/2014

OTHER PUBLICATIONS

"Singapore Search Report and Examination Report", dated Aug. 2, 2018 (dated Aug. 2, 2018), IPOS Intellectual Property Office of Singapore, for Singapore Application No. 10201501246T, 7pgs.

* cited by examiner

*Primary Examiner* — Calvin L Hewitt, II
*Assistant Examiner* — Taylor S Rak
(74) *Attorney, Agent, or Firm* — Buckley, Maschoff & Talwalkar LLC

(57) ABSTRACT

A method is provided for processing an electronic payment. The method comprises (a) receiving, by a server, a first electronic request for a first token from a cardholder's device, the server being in communication with a database storing payment credentials for one or more payment cards associated with the cardholder; (b) generating the first token using an identity of the cardholder's device and transmitting the first token to the device; (c) receiving a second electronic request for processing the transaction from a merchant terminal, said second request comprising the first token and a merchant terminal identifier; (d) generating a second token using the first token and the merchant terminal identifier and transmitting the second token to the merchant terminal; (e) receiving a third token and a transaction authorization request from a merchant acquiring bank; (f) validating the third token using the second token; and (g) upon the validation operation (f) being successful, submitting the transaction authorization request to a card issuing bank.

12 Claims, 3 Drawing Sheets

METHODS AND SYSTEMS FOR PROCESSING AN ELECTRONIC PAYMENT

CROSS-REFERENCE TO RELATED APPLICATION

This application is a U.S. National Stage filing under 35 U.S.C. § 119, based on and claiming benefit of and priority to SG Patent Application No. 10201501246T filed Feb. 17, 2015.

FIELD OF INVENTION

This invention relates to a method and system for processing an electronic payment. In particular, it provides a method and system for securing transaction data in an electronic payment carried out over a payment network.

BACKGROUND

The use of payment cards has become increasing popular. For example, credit cards, debit cards, charge cards, pre-paid cards and other similar plastic cards are often used in place of cash in point-of-sale (POS) transactions. Payment cards do not have to be embodied in plastic cards, they may be embodied a form of other physical devices such as appropriately configured smart phones. Further, they may be merely bank accounts associated with account numbers (such as the primary account number, PAN) which have been typically used for performing internet-based/e-commerce transactions (e.g. making a payment) with a merchant. The payment cards are typically issued by banks (i.e. issuing banks) and are associated with one or more bank accounts (e.g. a credit card account, a loan account, a checking account, a saving account etc) of the cardholder at the issuing bank.

In a typical POS transaction involving a physical payment card, a cardholder presents the physical card as payment to a merchant and the merchant submits the transaction to an acquirer (i.e. acquiring bank). The acquirer verifies the card number, the transaction type and the amount with the issuer and reserves that amount of the cardholder's credit limit for the merchant. For internet-based or e-commerce purchases (or other card-not-present transactions), the cardholder provides certain information of the card (e.g. the card number, expiration date, security code and/or other information of the card) to the merchant, who then prepares an authorization request based on the card information without seeing the physical card.

Credit card security relies on the physical security of the plastic card and the privacy of the credit card number. However, in the above process, sensitive card data such as the card number, may be get stolen or otherwise compromised, since the card related data are accessed by multiple parties and can be intercepted during the transmission of the transaction details among relevant parties.

To minimize fraudulent use of credit cards, sensitive card data are usually encrypted or tokenized (a process in which sensitive data is replaced by non-sensitive data which is infeasible to reverse in the absence of a detokenization system) before it is handled by the relevant parties, for example, during the transmission, processing or storage of transaction related details.

However, there are still loopholes with the existing way of handling payment, which may expose the sensitive transaction data to security risks. Therefore, it is desirable to provide an improved system for processing a payment.

SUMMARY OF INVENTION

The present invention aims to provide a system and method of processing an electronic payment carried out over a payment work such that the payment credentials (e.g. the primary account number (PAN) of a payment card) or related data and other sensitive transaction data involved in a transaction are more securely protected.

In general terms, the present invention proposes securing a payment transaction both at the cardholder's end who initiates the transaction and at the merchant end where the transaction is made.

According to a first aspect, there is provided a method for processing an electronic payment. The method comprises the operations of:

(a) receiving, by a server, a first electronic request for a first token (e.g. a device PAN—DPAN) from a cardholder's device (such as a mobile phone), the server being in communication with a database storing payment credentials for one or more payment cards associated with the cardholder;

(b) the server generating the first token using an identity of the cardholder's device and transmitting the first token to the cardholder's device;

(c) receiving, by the server, a second electronic request for processing the transaction from a merchant terminal, said second request comprising the first token, a merchant terminal identifier and optionally a timestamp associated with the second electronic request;

(d) the server generating a second token (e.g. a proxy PAN—PPAN) using the first token, the merchant terminal identifier and optionally the timestamp, and transmitting the second token to the merchant terminal;

(e) receiving, by the server, a third token and a transaction authorization request from a merchant acquiring bank;

(f) the server validating the third token using the second token; and (g) upon the validation operation (f) being successful, submitting, via the server, the transaction authorization request to a card issuing bank.

Advantageously, compared to existing payment processes, the present payment process requires an additional layer of security—a second token to be generated for the merchant terminal, in addition to one for the cardholder's device. The second token comprises "domain information" describing transaction information of both the cardholder and the merchant, and the acquirer (the merchant acquiring bank) of the merchant is required to produce this second token before communicating with the card issuing bank to effect the transaction. Accordingly, the method will ensure that the PPAN needs the presence of the consumer and the merchant together for making a payment and this in turn prevents the misuse of the PANs stolen either from the consumer or from the merchant. In other words, even if the token is compromised at the merchant's end, it cannot be used for transactions with any other merchants.

The first token carries information about the cardholder's device and therefore can be used to ensure that any payment credentials, which are typically the 16-digit card number seen on credit/debit cards (or the primary account number, PAN), can be used only from the device on which the first token was downloaded. Therefore, even if the first token is compromised, other devices would not be able to make use of the real payment credentials associated with the first token. This is because the first token and its associated real payment credentials are "locked" to the particular device.

Typically (but not always), the first token is requested each time the cardholder wants to make a payment. In other words, a new first token is generated for a different transaction. However, in some embodiments, the electronic request for a first token does not have to be generated immediately prior to a time when a cardholder wants to initiate the present payment. Instead, the first token may have been generated some time in the past, for example, in respect of a past transaction carried out earlier. In one example, the first token may be generated once for the cardholder's device and then be stored by the device, or the server, for any future transactions.

In one embodiment, the database further stores identity data of the cardholder for a payment system at which the cardholder has previously registered, the method further comprising an operation of verifying an identity of the cardholder prior to operation (b) using the identity data. For example, a cardholder may use a MasterPass™ ID and password to authenticate his/her identity before the server generates and transmits the first token to the cardholder's device.

Typically, the first token is generated further using payment credentials of a chosen payment card associated with the cardholder.

In one embodiment, the first token is generated further using a timestamp of the first electronic request. This allows the first token to carry time-related information so that this information may be used for monitoring the legitimacy of subsequent activities carried out using this token.

Typically, the second token is generated further using a timestamp of the second electronic request. In one example, the server receives a first timestamp associated with the first electronic request and a second timestamp associated with the second electronic request. Then the server determines if a time difference between the first and second timestamps meets a pre-defined criterion (for example, it is shorter than a pre-defined time window), and proceeds with operation (d) only if the criterion is met.

In one embodiment, operation (g) comprises submitting the payment credentials of the chosen card to the card issuing bank. Operation (f) may comprise extracting from the third token the payment credentials of the chosen card using a detokenization system.

Alternatively, the invention may be expressed as a system for processing an electronic payment. The system comprises a server configured to be in communication with a cardholder's device, a merchant terminal, a merchant acquiring bank and a card issuing bank. The server has a computer processor and a data storage device, and the data storage device stores non-transitory instructions operative by the processor to cause the processor to perform the operations of the method as described above.

Furthermore, the invention may be expressed as a method performed by a merchant terminal for processing an electronic transaction between a cardholder and a merchant carried out over a payment network. The method comprises the operations of:
  (a) receiving, by the merchant terminal, a first token from a cardholder's device, said first token being associated with an identity of a cardholder's device,
  (b) the merchant terminal transmitting an electronic request for processing the payment to a server; said electronic request comprising the first token and a merchant terminal identifier;
  (c) the merchant terminal receiving, via the server, a second token; said second token being generated using the first token and the merchant terminal identifier; and
  (d) the merchant terminal transmitting the second token to a merchant acquiring bank, thereby causing the merchant acquiring bank to communicate with a card issuing bank to effect the transaction.

Typically, operation (d) comprises encrypting the second token and transmitting the encrypted token to the merchant acquiring bank.

The invention may also be expressed as a merchant terminal for processing an electronic transaction. The merchant terminal comprises a computer processor and a data storage device, and the data storage device stores non-transitory instructions operative by the processor to cause the processor to perform the method as described above.

Furthermore, the invention may be expressed as a method performed by a merchant acquiring bank for processing an electronic transaction between a cardholder and a merchant carried out over a payment network. A cardholder's device is associated with a first token generated using an identity of the cardholder's device and a merchant terminal is associated with a second token generated using the first token and a merchant terminal identifier. The first and second tokens are generated by a server. The method comprises: receiving, by a merchant acquiring bank, a third token; and the merchant acquiring bank transmitting the third token to the server thereby causing the server to communicate with a card issuing bank to effect the transaction upon the third token being validated by the server using the second token.

The term "payment card" referred to in this document may include but is not limited to a physical (e.g. plastic) card. Rather, the term refers to a bank account such as a credit card, a debit card, loan, checking, and/or savings account, having a primary account number (PAN) maintained by a bank ("the card issuing bank"). The PAN functions as payment credentials used when making a payment. Conventionally, the PAN is a 16-digit PAN number, which, if a physical card exists, is printed on the card. However, a payment card can be used in the present invention irrespective of whether a physical card bearing the payment credentials exists. Non exhaustive examples of payment cards include a credit card, a debit card, a prepaid card, a charge card, a membership card, a promotional card, a frequent flyer card, an identification card, a prepaid card, a gift card. A payment card may also be embodied in another device that may hold payment card information (including bank account information associated with the card), such as mobile phones, smartphones, personal digital assistants (PDAs), key fobs, transponder devices, NFC-enabled devices, and/or computers.

The term "payment credentials" refers to an identifier associated with a payment card which allows the payment card to be uniquely identified within a context. In most cases, the payment credentials are the card number printed on the card (also known as the PAN), e.g. the 16-digit card number of a MasterCard payment card.

The term "token" means a piece of data, typically used in place of real or sensitive information as a surrogate value. A token may be represented by a series of digits, alphabets, alphanumerical characters or any other characters or symbols such as punctuations.

BRIEF DESCRIPTION OF THE DRAWINGS

Embodiments of the invention will now be described for the sake of non-limiting example only, with reference to the following drawings in which.

DETAILED DESCRIPTION

Figure 1:
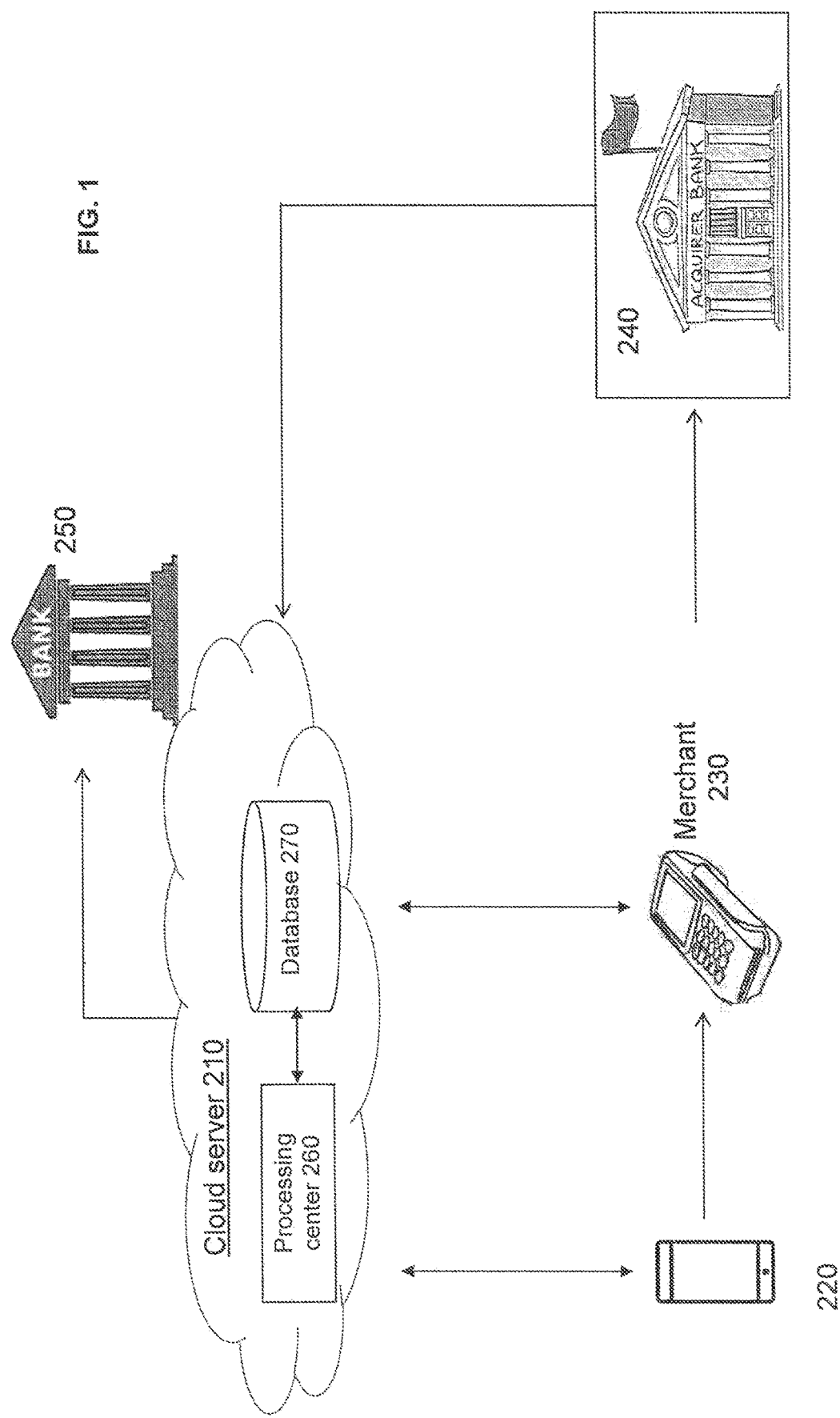
FIG. 1 illustrates a system which is an embodiment of the invention.

FIG. 1 shows a system which is an embodiment of the invention. The system performs a process which is described below with reference to FIGS. 2 and 3.

As shown in FIG. 1, a server 210 is provided which is configured to handle requests and/or communications from various terminals associated with parties involved in a transaction carried out over a payment network. The server 210 interfaces a cardholder's device 220, a merchant terminal 230, a merchant acquiring bank 240 (i.e. the acquirer) and a card issuing bank (i.e. the issuer) 250. The various terminals communicate with the server 210 via any types of network, for example, virtual private network (VPN), the Internet, a local area and/or wide area network (LAN and/or WAN), and so on.

Figure 2:
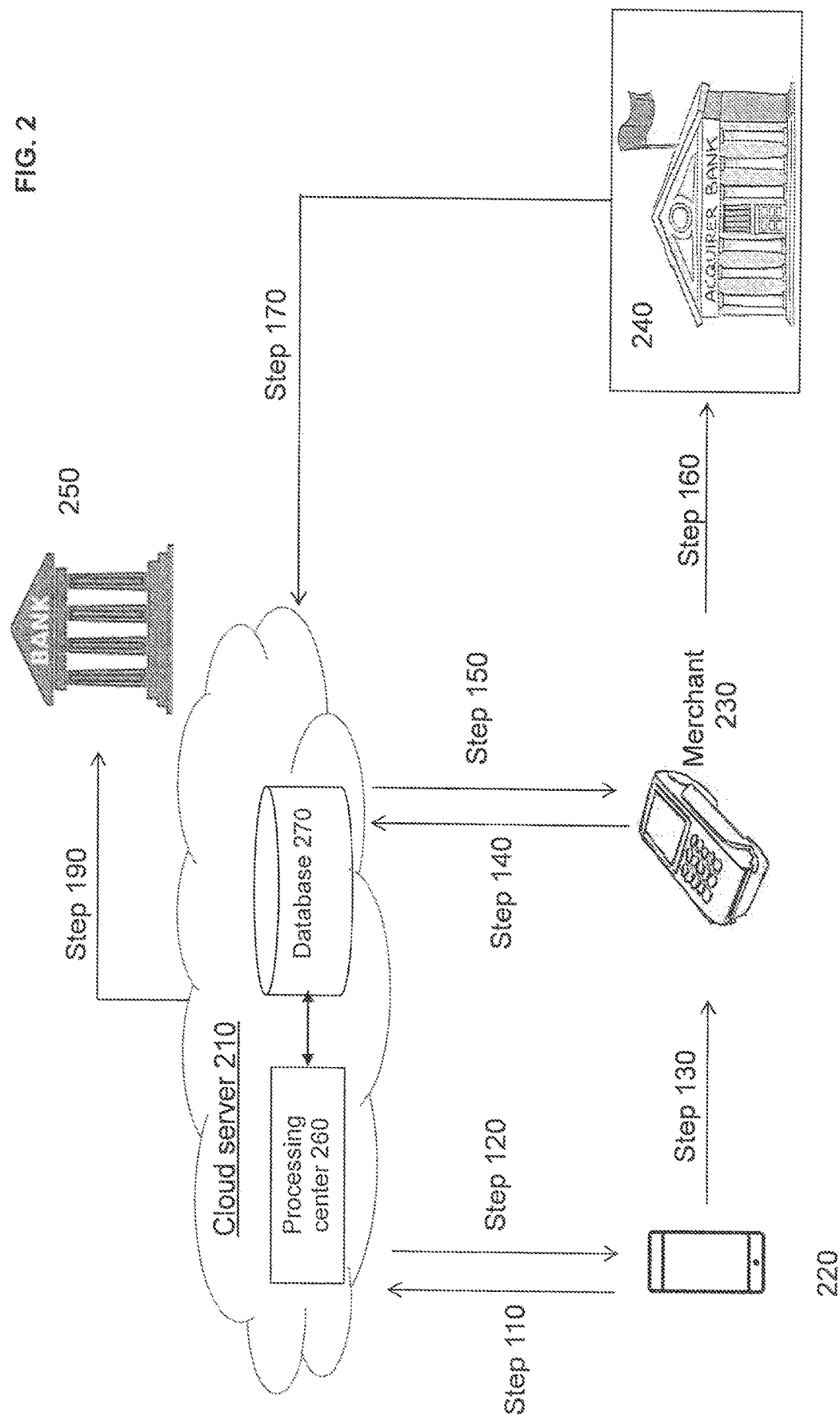
FIG. 2 illustrates process steps which are performed by the system of FIG. 1 during a transaction process which is an embodiment of the invention.
Figure 3:
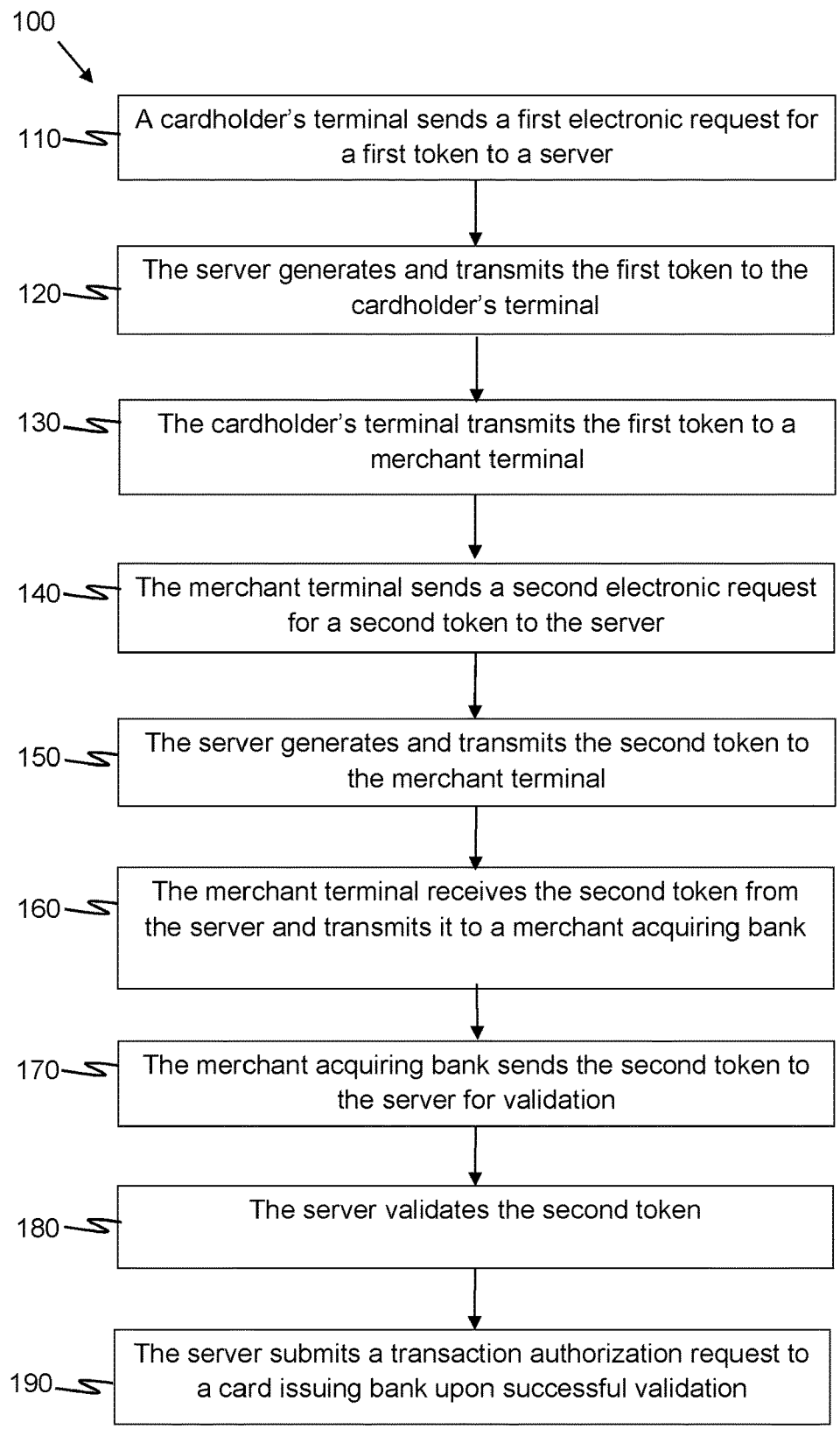
FIG. 3 is a flow diagram of steps in the transaction process of the embodiment of FIG. 2.

The block diagram of FIG. 2 illustrates a flow of an exemplary method carried out by various parties or systems using a payment network. The payment network can be any electronic payment network which connects, directly and/or indirectly payers (consumers and/or their banks or similar financial institutions) with payees (the merchants and/or their banks or similar financial institutions). Non-limiting examples of the payment network are a payment card type of network such as the payment processing network operated by MasterCard, Inc.

In this example, the server 210 is a cloud server comprising multiple connected servers. Alternatively, as will be understood by a skilled person, the server 210 could be a dedicated physical server. The server 210 as illustrated comprises one or more processing centers 260, which are usually implemented as one or more computer processors. A database 270 is stored by the server and is accessible by the processing center 260. The database 270 contains payment credentials for one or more payment cards associated with cardholders. The database 270 may store the payment credentials for payment cards issued by a same payment card association, such as an issuing bank. In another embodiment, the database stores payment credentials for payment cards issued by multiple card issuing banks. The server 210 further has a data storage device (not shown) storing instructions operative by the one or more processors to cause the processor to perform a method 100 described below with reference to FIG. 3. The data storage device may be any physical persistent storage device such as, but not limited to a hard-drive.

At step 110, the server 210 receives a first electronic request for a first token from the cardholder's device 220. The cardholder's device 220 is any electronic device that can be used by the cardholder to communicate with the server 210. In this example, the cardholder's device 220 is a smart phone. It will be understood by a skilled person that other electronic devices such as media players and smart watches could also be used.

As explained above, the request may be sent by the cardholder's device 220 to the server 210 over any type of network. The first electronic request may be initiated by the cardholder's device 220 by sending payment credentials of his/her payment card to the server 210 via a user-interface of the cardholder's device 220. The consumer's device on which the first token request is generated is typically secured using a biometric identifier or a PIN, and only based on this verification will the server allow the first token to be downloaded for use. In other words, the user's device is secured such that the first token can only be requested by the legitimate owner of the device, and prevents illegitimate access to the first token.

Alternatively, the first electronic request may be initiated by sending identity data of the cardholder for a payment system at which the cardholder has previously registered, for example, by sending MasterPass™ user names, password and/or other related information to the server 210. The server verifies an identity of the cardholder using the submitted identity data. The verification may be performed using data stored in the database 270 of the server 210, including identity data of the cardholder for a payment system at which the cardholder has previously registered. In some embodiments, a timestamp of the first electronic request is also received by the server 210. The timestamp may include time information (time and/or date) of the first electronic request sent by the cardholder's device 220, received by the server 210, or processed by any party involved in an intermediate step (e.g. a network service provider). Other transaction related information may be included in the first electronic request such as details about a payment card the cardholder intends to use.

At step 120, the processing center 260 of the server 210 generates the first token, for example, a device primary account number (DPAN), using an identity of the cardholder's device 220. In this example, the first token is generated using a unique identifier (e.g. an IMEI number of the phone) of the device and a payment credentials of a chosen payment card associated with the cardholder. In other words, the DPAN encodes the information associated with the cardholder's device and its associated payment credentials. DPAN may be generated using a tokenization method or by encryption. In some embodiments, the DPAN is in a format which resembles the real card credentials, for example, a 16-digit number. DPAN may further carry information of the timestamp of the first electronic request, for example, if available to the server 210. In one embodiment, the value of the timestamp is used for generating the DPAN. By associating the DPAN to the time, it is highly likely that another transaction can never repeat with the same DPAN and cannot be copied.

At step 130, the cardholder's device transmits the DPAN to the merchant terminal 230. The DPAN may be sent to the merchant terminal 230 via any type of network such as a contactless interface (e.g. via a contactless QR code readers).

At step 140, the merchant terminal 230 transmits a second electronic request for processing the payment to the server 210, the electronic request comprising the DPAN and a merchant terminal identifier. A merchant terminal identifier typically includes a merchant identification number (MID) and a terminal identification number (TID). The MID is a unique number assigned to a merchant account to identify it throughout the course of processing activities and TID is a unique number assigned and linked to a specific point-of-sale (POS) terminal or workstation. The merchant terminal identifier thus allows a merchant terminal at which transactions are carried out to be uniquely identified within a context. In this example, a timestamp of the second electronic request is also received by the server 210. Similarly, the timestamp may include time information of the second electronic request sent by the merchant terminal 230, received by the server 210, or processed by any party involved in an intermediate step (e.g. a network service provider). Further transaction details may be submitted to the server for processing such as a transaction amount and a transaction location (e.g. by using GPS data of the terminal or manually entered data).

In one embodiment, upon the server 210 receiving the second electronic request, the processing center 260 processes the request and generates a proxy PAN (PPAN) using the DPAN and a merchant primary account number (MPAN) at step 150. Preferably, the MPAN is generated using the DPAN and the merchant terminal identifier. Accordingly, the MPAN encodes information about both the cardholder and merchant terminal. The MPAN may encode further transaction details such as the transaction amount and/or transaction location. The server 210 generates the PPAN by combining and/or converting the DPAN and MPAN into a format which resembles real payment credentials. According to a particular example, the DPAN and MPAN may each have the format of a 16-digit number and the PPAN is obtained by combining a respective subset of the digits of the DPAN and MPAN into a 16-digit number. In this example, before the server 210 generates the MPAN and/or the PPAN, the server 210 calculates a time difference between the timestamps of the first and second electronic request. The server 210 then determines if the difference is shorter than a pre-defined time window. The pre-defined time window may be up to 60 seconds, up to 100 seconds, up to 180 seconds or any other suitable duration. The server 210 may refuse the second electronic request if it is determined that the time difference exceeds a pre-defined duration.

At step 160, the server 210 sends the second token (e.g. the PPAN) to the merchant terminal 230 for transmitting to the merchant acquiring bank 240 so as to cause the merchant acquiring bank 240 to communicate with the card issuing bank 250 to effect the transactions. In this example, the merchant terminal 230 may encrypt the second token using a cryptogram before transmission for enhanced security. The cryptogram can be generated using EMV standards.

At step 170, the merchant acquiring bank 240 sends the second token and a transaction authorization request to the server 210. The merchant acquiring bank 240 may present other transaction details (such as acquirer identifier) to the server 210 seeking a validation of the payment credentials thereby causing a card issuing bank to effect the transaction, e.g. requesting the reserving of the transaction amount of the merchant acquiring bank 240.

At step 180, the server 210 validates the PPAN received from the merchant acquiring bank 240 using the DPAN and MPAN, which are stored by the server 210. In one example, the server 210 validates the EMV data using the PPAN stored on the server 210 so as to verify that the transaction was submitted using a PPAN which was previously generated by the server 210, before sending the transaction for the bank's authorization. Following successful validation, the server 210 submits the transaction authorization request to a card issuing bank 250 at step 170 for authorization. The server 210 submits payment credentials of the chosen card to the card issuing bank, optionally after a detokenization step of PPAN, from which the associated payment credentials can be extracted. For example, the servers 210 sends a pre-mapped funding PAN (e.g. the real payment credentials of the chosen card that has a mapping with the DPAN in the server 210) to the card issuing bank for authorization.

Whilst the foregoing description has described exemplary embodiments, it will be understood by those skilled in the art that many variations of the embodiment can be made within the scope and spirit of the present invention. For example, it is not required for the server to physically store the database 270. Instead, the database 270 can be stored somewhere else but made accessible to the processing center 260. For another example, the system described above can be used for both point-of-sales transactions and internet-based (e-commerce) transactions in which the role of the merchant terminal is played by at least one server. In the latter case, the DPAN can be sent to the merchant terminal via, for example, a mobile network or the internet.

The invention claimed is:

1. A method for processing an electronic payment comprising the operations of:
   (a) storing, by a server, a time window and user data;
   (b) receiving, by the server, a first electronic request for a first token from a cardholder's device and a first time stamp associated with the request, the server being in communication with a database;
   (c) generating, by the server, the first token using an identity of the cardholder's device and transmitting the first token to the cardholder's device, wherein the generated first token includes the first time stamp and stored user data;
   (d) transmitting, by the server, the first token to a merchant terminal via the cardholder's device;
   (e) receiving, by the server, a second electronic request for processing a transaction from the merchant terminal, said second request comprising the first token, a second time stamp, and a merchant terminal identifier;
   (f) calculating, by the server, a difference between the first and second time stamps;
   (g) determining, by the server, the difference is less than the time window;
   (h) generating, by the server, a second token using the first token and the merchant terminal identifier based on the determination, storing, by the server, the second token on the server and transmitting, by the server, a copy of the second token to the merchant terminal;
   (i) receiving, by the server, the copy of the second token and a transaction authorization request from a merchant acquiring bank;
   (j) extracting and retrieving, by the server, a primary account number (PAN) from the received copy of the second token and sending the PAN to a card issuing bank for authorization.

2. A method according to claim 1, wherein the database further stores identity data of the cardholder for a payment system, the method further comprising: verifying, by the server, an identity of the cardholder prior to operation (c) using the identity data.

3. A method according to claim 1, further comprising: choosing, by the server, a payment card associated with the cardholder prior to operation (c), and wherein operation (c) comprises generating the first token further using payment credentials of the chosen payment card associated with the cardholder.

4. A method according to claim 1, wherein operation (h) comprises generating the second token further using the second timestamp.

5. A method according to claim 1, further comprising: choosing, by the server, a card prior to operation (j) and wherein operation (j) comprises submitting, via the server, payment credentials of the chosen card to the card issuing bank.

6. A method according to claim 5, further comprising extracting, by the server, from the received copy of the second token the payment credentials of the chosen card using detokenization.

7. A system for processing an electronic payment comprising:
   a server operative to communicate with a cardholder's device, a merchant terminal and a merchant acquiring bank, said server comprising:
   a computer processor; and
   a non-transitory data storage device coupled to the computer processor, the data storage device storing instructions which, when executed by the computer processor, cause the computer processor to perform operations comprising:
   (a) storing a time window and user data;
   (b) receiving a first electronic request for a first token from a cardholder's device and a first time stamp associated with the request, the server being in communication with a database;
   (c) generating the first token using an identity of the cardholder's device and transmitting the first token to the cardholder's device, wherein the generated first token includes the first time stamp and the stored user data;
   (d) transmitting the first token to the merchant terminal via the cardholder's device;
   (e) receiving a second electronic request for processing a transaction from the merchant terminal, said second request comprising the first token, a second time stamp, and a merchant terminal identifier;
   (f) calculating a difference between the first and second time stamps;
   (g) determining the difference is less than the time window;
   (h) generating a second token using the first token and the merchant terminal identifier based on the determination, storing the second token on the server and transmitting a copy of the second token to the merchant terminal;
   (i) receiving the copy of the second token and a transaction authorization request from a merchant acquiring bank;
   (j) extracting and retrieving a primary account number (PAN) from the received copy of the second token, and sending the PAN to a card issuing bank for authorization.

8. A system according to claim 7, wherein the database further contains identity data of the cardholder for a payment system, the system further comprising instructions which, when executed by the computer processor, cause the computer processor to perform operations comprising: verifying an identity of the cardholder prior to operation (c) using the identity data.

9. A system according to claim 7, wherein the data storage device further stores instructions operative by the processor to cause the processor to generate the first token further using payment credentials of one of the payment cards associated with the cardholder.

10. A system according to claim 7, wherein the data storage device further stores instructions operative by the processor to cause the processor to generate the second token further using the second timestamp.

11. A system according to claim 7, wherein the data storage device further stores instructions operative by the processor to cause the processor to submit payment credentials of one of the payment cards associated with the cardholder to the card issuing bank.

12. A system according to claim 11, wherein the data storage device further stores instructions operative by the processor to cause the processor to extract from the received copy of the second token, the payment credentials of one of the payment cards associated with the cardholder using detokenization.

* * * * *